W. R. GESSLER.
LAWN MOWER GRASS GATHERING ATTACHMENT.
APPLICATION FILED MAR. 22, 1916.
1,199,688.
Patented Sept. 26, 1916.
2 SHEETS—SHEET 2.
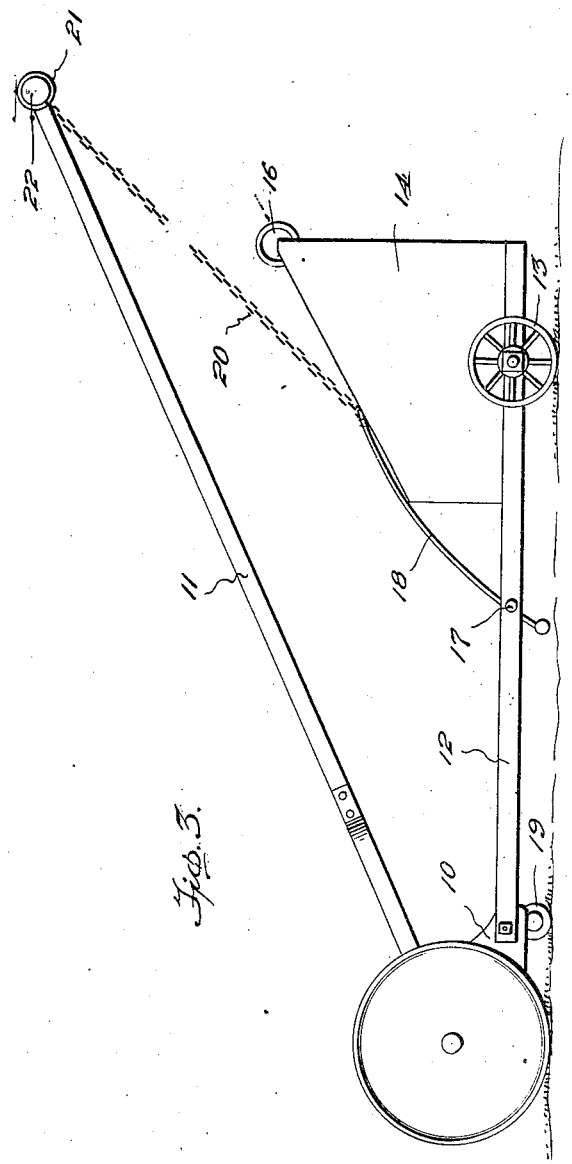
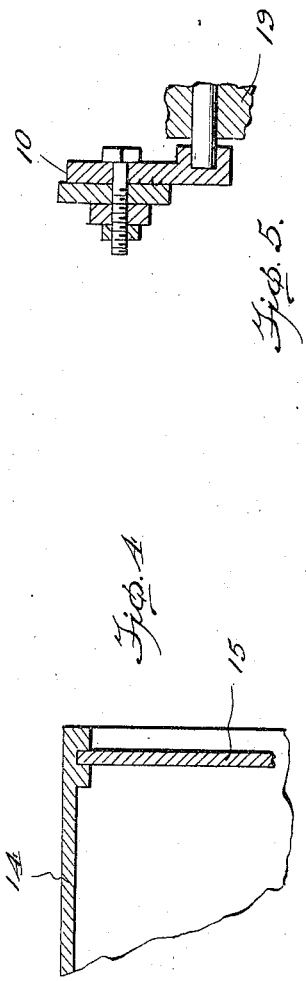
Inventor
W. R. Gessler.
By John Louis Waters & Co.
Attorney

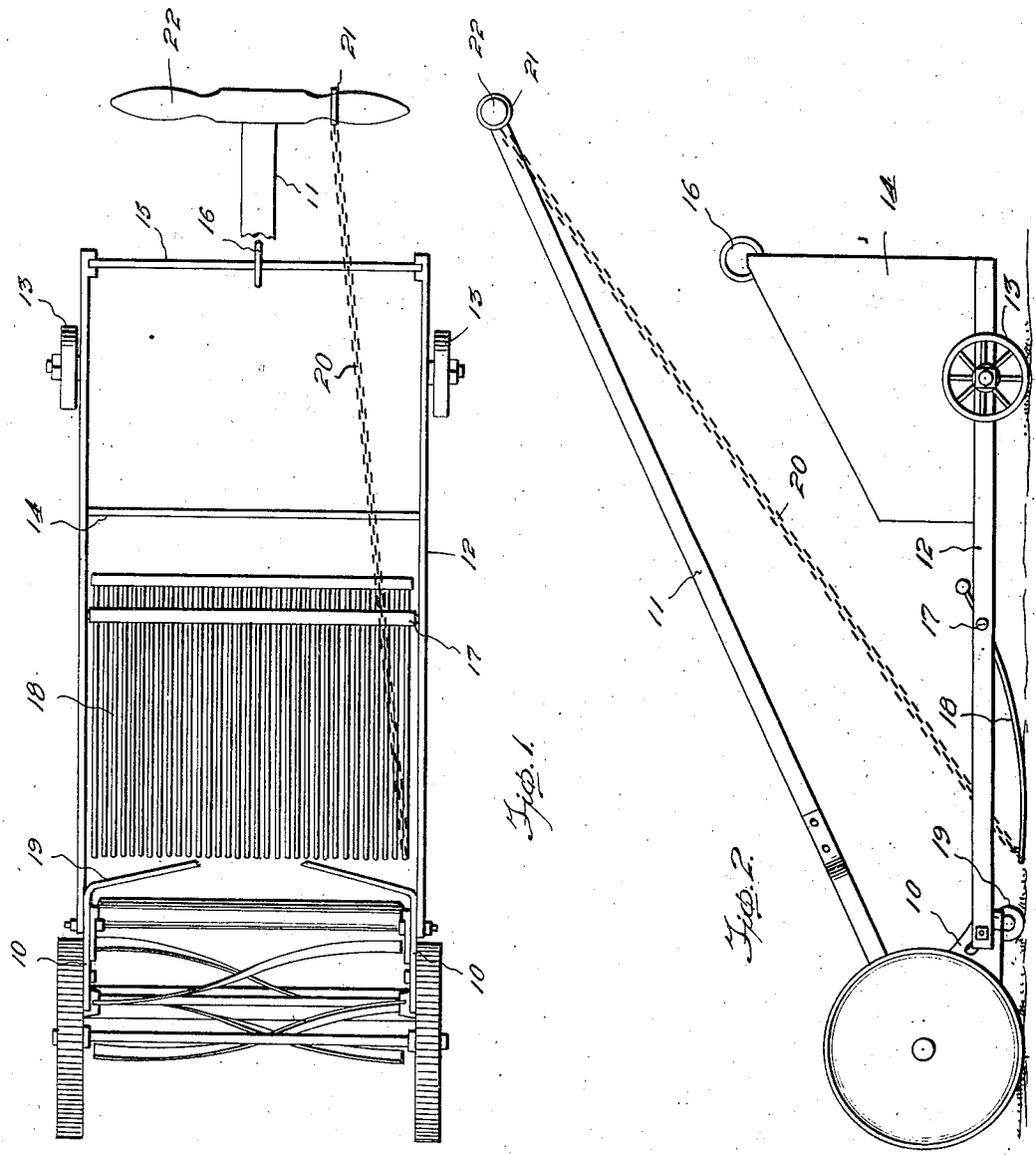

UNITED STATES PATENT OFFICE.

WILLIAM R. GESSLER, OF NEW YORK, N. Y.

LAWN-MOWER GRASS-GATHERING ATTACHMENT.

1,199,688. Specification of Letters Patent. Patented Sept. 26, 1916.

Application filed March 22, 1916. Serial No. 85,837.

*To all whom it may concern:*

Be it known that I, WILLIAM R. GESSLER, a citizen of the United States, residing at New York city, in the county of New York and State of New York, have invented certain useful Improvements in Grass-Gathering Attachments for Lawn-Mowers, of which the following is a specification, reference being had therein to the accompanying drawing.

This invention relates to improvements in grass gathering attachments for lawn mowers, one object of the invention being the provision of an attachment adapted to be disposed at the rear of the mower and to be movable therewith so as to receive the grass as it is cut by the blades, such means being mounted for tilting movement, so that the same may be tilted manually to empty the grass therefrom into a receiving receptacle.

A further object of this invention is the provision of a simple, durable and inexpensive device of this character which is readily attached to a lawn mower and which is thoroughly efficient and practical in use.

In the accompanying drawings: Figure 1 is a top plan view of the attachment, dotted lines showing the position of the lawn mower to guide the handle thereof. Fig. 2 is a side elevation of the same, the gathering fork being in the position it assumes when receiving the cut grass. Fig. 3 is a similar view showing the fork tilted to empty the cut grass into the receptacle. Figs. 4 and 5 are detailed views of various parts of the mechanism.

Referring to the drawings, the numeral 10 designates the lawn mower frame and 11 the handle thereof. Detachably secured to the frame 10 is a gatherer carrying frame 12 which extends rearwardly of the lawn mower and below the handle thereof, and is supported upon wheels 13. Mounted in the rear end of this frame 12 is a sheet metal hopper 14 which is open at its top to receive the grass after the same is gathered and which is provided with the sliding rear door 15 controlled by the ring 16, so that the hopper may be emptied at pleasure.

Journaled for oscillatory movement within the frame 12 is a rod 17 which has secured thereto for swinging movement the gathering fork 18 which normally assumes the position to receive the grass as it is cut and thrown rearwardly by the lawn mower, the forward ends of the prongs of the fork being disposed adjacent to and slightly in the rear of the roller 19 of the lawn mower.

In order to provide a simple means for elevating the swinging fork 18 so that the contents thereof may be deposited within the receptacle 14 through the upper open end thereof, a flexible connection 20 is secured at its forward end to the free end of the fork and is provided with the loop end 21 for sliding upon the hand grip 22 of the handle 11 of the lawn mower. It is of course understood that the fork 18 is pivoted sufficiently close to the receptacle or hopper 14 so that there will be no possibility of the loss of the load when the fork is raised for throwing the load into the hopper. This hopper may be open at its front if desired or the front wall thereof may be of any desired height best adaptable for receiving the load from the fork.

It is apparent that the grass when cut will be gathered in the fork 18 when in the position shown in Figs. 1 and 2 of the drawing and when said fork has been filled, the cord 20 may be jerked or pulled upon by the operator to lift the fork and on the upward movement of said fork it will throw the contents thereof into the hopper 14, whereupon the operator manipulates the cord 20 to throw the fork 18 to its normal position for again receiving grass. Where so desired, the hopper 14 may be made in the form of a funnel and have a bag attaching device so that a bag may be connected thereto to receive the cut grass released from the fork and thus dispense with the door construction of the receptacle.

What I claim as new is:—

1. A grass gathering attachment for a lawn mower comprising a frame having the forward ends thereof detachably connected with the lawn mower, a rod mounted in the frame at an intermediate point thereof, a grass gathering device swingingly supported by the rod, a hopper mounted on the frame, and a flexible connection between the grass gathering device and the handle of the lawn mower for the swinging of said device into a position to discharge its load, and also for swinging it into a position for gathering a load.

2. A grass gathering attachment for lawn mowers comprising a wheel support, means for detachably connecting the support to the lawn mower, a fork swingingly mounted in the support, a receiver on the support for receiving a load from the fork, and means for swinging the fork into loading and unloading positions.

3. A grass gathering attachment for lawn mowers comprising a substantially U-shaped frame, means for detachably connecting the frame to the lawn mower, a rod mounted in the frame, a grass gathering device swingingly supported by the rod, and a flexible connection between the device and the handle of the lawn mower for the swinging of said device into a position for relieving its load, and also for swinging it to a position for gathering a load, said connection being of a length to support the gathering device in position for receiving a load.

In testimony whereof I affix my signature.

WILLIAM R. GESSLER.